United States Patent
Bowie et al.

(10) Patent No.: US 12,273,341 B2
(45) Date of Patent: Apr. 8, 2025

(54) MUTUAL IDENTITY VERIFICATION

(71) Applicant: International Business Machines Corporation, Armonk, NY (US)

(72) Inventors: Dale Bowie, Benowa (AU); Jasmine Anne Smith, Southport (AU); Jared Ross Page, Southport (AU)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 16/421,536

(22) Filed: May 24, 2019

(65) Prior Publication Data
US 2020/0374287 A1    Nov. 26, 2020

(51) Int. Cl.
*H04L 29/00* (2006.01)
*H04L 9/40* (2022.01)
*H04W 12/06* (2021.01)
*H04W 12/69* (2021.01)

(52) U.S. Cl.
CPC ...... *H04L 63/0869* (2013.01); *H04L 63/0861* (2013.01); *H04W 12/06* (2013.01); *H04W 12/69* (2021.01)

(58) Field of Classification Search
CPC ............ H04L 63/0869; H04L 63/0861; H04L 9/3226; H04L 9/3263; H04L 63/0807; H04L 63/0823; H04L 63/083; H04W 12/0051; H04W 12/06; H04W 12/69; G06F 21/32
See application file for complete search history.

(56) References Cited

U.S. PATENT DOCUMENTS

| | | | |
|---|---|---|---|
| 8,028,329 B2 | 9/2011 | Whitcomb | |
| 8,156,334 B2 | 4/2012 | Ho | |
| 8,220,030 B2 | 7/2012 | Singhal | |
| 8,549,594 B2 | 10/2013 | Lin | |
| 9,197,746 B2 | 11/2015 | Kurapati et al. | |
| 9,716,715 B2 | 7/2017 | Daley et al. | |
| 10,110,738 B1 * | 10/2018 | Sawant | G06N 3/0445 |
| 10,659,459 B1 * | 5/2020 | Gadwale | G06F 21/32 |

(Continued)

OTHER PUBLICATIONS

Reaves et al., "AuthentiCall: Efficient Identity and Content Authentication for Phone Calls",This paper is included in the Proceedings of the 26th USENIX Security Symposium, Aug. 16-18, 2017 • Vancouver, BC, Canada, ISBN 978-1-931971-40-9, 19 pages. https://www.usenix.org/conference/usenixsecurity17/technical-sessions/presentation/reaves.

*Primary Examiner* — Brandon Hoffman
*Assistant Examiner* — Helai Salehi
(74) *Attorney, Agent, or Firm* — Scott Dobson

(57) ABSTRACT

A method, system, and computer program product for frictionless mutual authentication of unsolicited communications may detect an incoming communication. A verification interface may be displayed on a consumer device. On the consumer device, a first valid verification may be received via the verification interface. In response to receiving the first valid verification, a challenge interface may be presented to an enterprise device. On the enterprise device, a second valid verification may be received via the challenge interface. In response to receiving the second valid verification, a verification credential may be presented to both the consumer device and the enterprise device. A connection for the incoming communication may be established between the consumer device and the enterprise device.

20 Claims, 5 Drawing Sheets

(56) References Cited

U.S. PATENT DOCUMENTS

| | | |
|---|---|---|
| 2004/0254990 A1 | 12/2004 | Mittal |
| 2018/0294959 A1 | 10/2018 | Traynor et al. |
| 2020/0076792 A1* | 3/2020 | Ray ..................... H04L 63/0815 |
| 2020/0195776 A1* | 6/2020 | Harrison ............. H04M 7/0036 |
| 2020/0259830 A1* | 8/2020 | Shaffer ................ H04L 63/108 |

* cited by examiner

MUTUAL IDENTITY VERIFICATION

BACKGROUND

The present disclosure relates generally to the field of identity verification, and more particularly to mutual identity verification, for example in the context of unsolicited communications.

A consumer may receive unsolicited phone calls from various sources, including organizations/businesses known to the consumer, as well as from unknown or initially unidentified sources. Verifying each party's identity to the other can be tedious and require manual processes with several steps.

SUMMARY

Disclosed herein are embodiments of a method, system, and computer program product for mutual identity verification.

A method, system, and computer program product for mutual authentication of communications may detect an incoming communication. A verification interface may be displayed on a consumer device. On the consumer device, a first valid verification may be received via the verification interface. In response to receiving the first valid verification, a challenge interface may be presented to an enterprise device. On the enterprise device, a second valid verification may be received via the challenge interface. In response to receiving the second valid verification, a verification credential may be presented to both the consumer device and the enterprise device. A connection for the incoming communication may be established between the consumer device and the enterprise device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
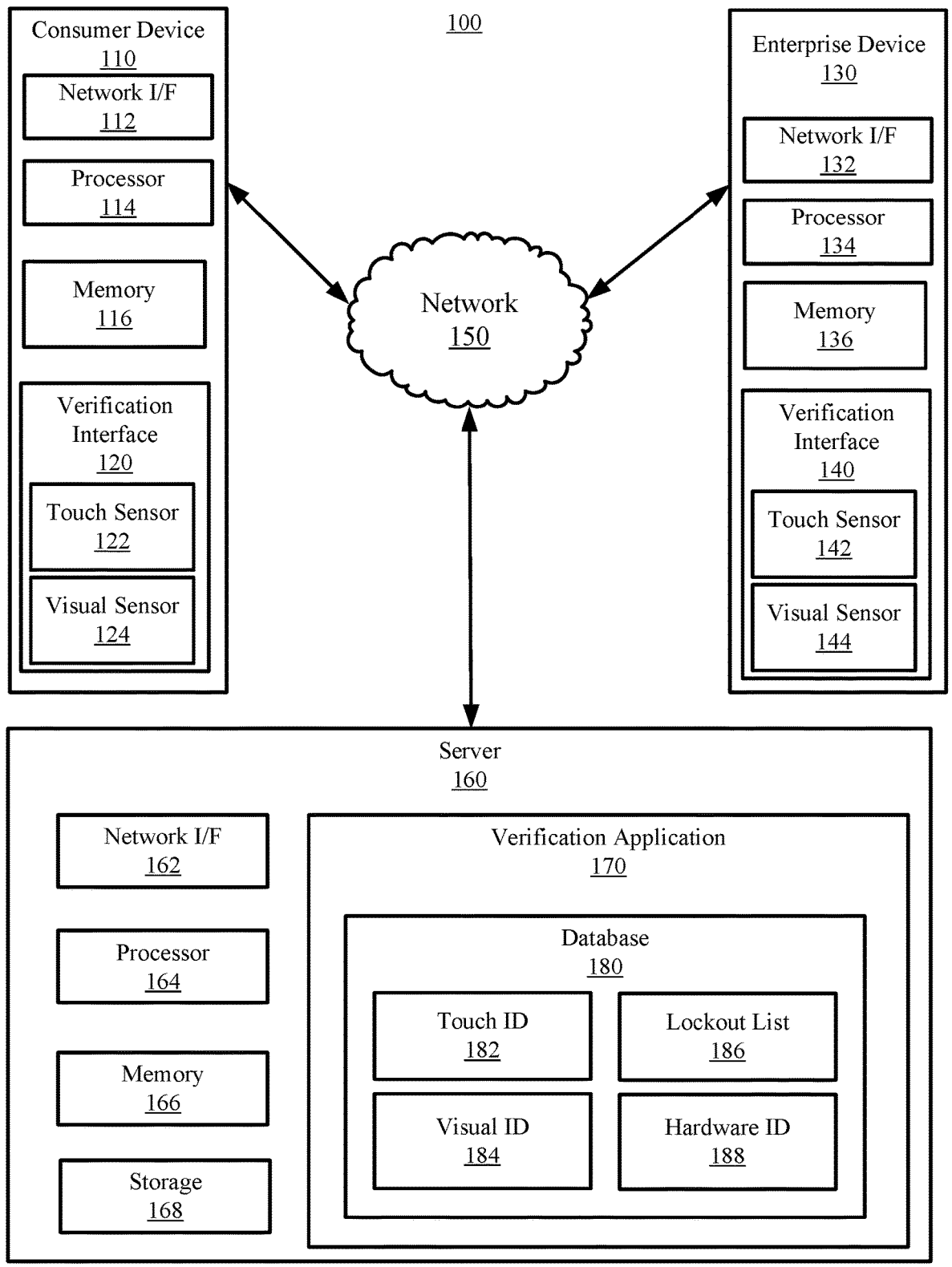
FIG. 1 illustrates an example network environment, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the field of identity verification, and more particularly to mutual identity verification, for example in the context of communications. While the present disclosure is not necessarily limited to such applications, various aspects of the disclosure may be appreciated through a discussion of various examples using this context.

A consumer may receive an unsolicited phone call or other communication from an unknown party claiming to be from an organization or enterprise known to the person. For example, a consumer may receive a call from a person alleging to be with the local utility company, a government agency (e.g., the Internal Revenue Service), a common vendor or retailer (e.g., a cable company, software provider, etc.).

It may be important for both parties (e.g., both the consumer and the enterprise) to validate each other's identity so that sensitive and/or personal information may be discussed and/or exchanged (e.g., personal health information, account numbers, billing information, payment credentials, etc.). Current methods of authenticating both parties can be tedious and cumbersome. For example, traditional two-factor authentication requires several manual steps involving several applications (e.g., the phone call software/device, in addition to text messages, e-mail, a second phone call, etc.) to achieve an out-of-band (e.g., a line of communication independent and isolated from the phone call itself) authentication.

The embodiments discussed herein provide for a frictionless (e.g., streamlined; without the need for multiple applications and multiple cumbersome/tedious manual steps) mutual authentication of both parties.

In embodiments, a system, computer program product, and method are envisioned whereby both parties must prove their identities before confidential or sensitive information may be discussed. In embodiments, a consumer may own a mobile device with a pre-installed and pre-registered application that may detect incoming calls and automatically initiate a frictionless out-of-band verification process with the enterprise. In embodiments, this may ensure the caller is verified prior to the phone, or mobile device, ringing for the consumer.

In embodiments, the consumer, and/or enterprise employee (or, in some embodiments where the call is automated, the enterprise system) initiating the call, may provide a biometric form of identification for authentication (e.g., fingerprint, iris scan, retinal scan, facial recognition, chemical biomarker), or a combination of biometrics for more secure authentication, via the application for a frictionless mutual authentication. In embodiments, unique identifiers from the consumer's mobile device (e.g., unique serial numbers from device components) may be further used to enhance security. For example, a security key needed to authenticate the application may be derived using a unique identifier as an input to a key-deriving function, thereby ensuring that the consumer's unique mobile device is the only mobile device allowed to process the relevant biometrics for the consumer.

According to embodiments, advantages of such a mutual authentication system may include prevention and avoidance of phishing and other social engineering attacks, faster and easier authentication that traditional two-factor authentication, fewer communication terminations (e.g., ignored calls due to unknown incoming phone number, calls terminated due to suspected phishing attacks, etc.), decreased problem-resolution times (e.g., where a consumer terminates a suspicious call in order to call a trusted number for the enterprise), more secure authentication (e.g., using "something you have," as opposed to "something you know").

As discussed above, embodiments of the present disclosure may utilize an application servicing mobile devices. Accordingly, an understanding of the embodiments of the present disclosure may be aided by describing embodiments of computer networks and the environments in which these systems and applications may operate. FIG. 1 illustrates a block diagram of an example networking environment 100 in which embodiments of the present disclosure may be implemented.

Consistent with various embodiments, the server 160, the consumer device 110, and the enterprise device 130 may be computer systems. The server 160, the consumer device 110, and the enterprise device 130 may include one or more processors 164, 114, and 134 and one or more memories 166, 116, and 136, respectively. The server 160, the consumer device 110, and the enterprise device 130 may be configured to communicate with each other through an internal or external network interface 162, 112, and 132. The network interfaces 162, 112, and 132 may be, e.g., modems or network interface cards. The server 160, the consumer device 110, and the enterprise device 130 may be equipped with a display or monitor (not pictured). Additionally, the server 160, the consumer device 110, and the enterprise device 130 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In embodiments, the consumer device 110 and enterprise device 130 may be equipped with verification interface 120 and 140, respectively. In some embodiments, the server 160, the consumer device 110, and the enterprise device 130 may be servers, desktops, laptops, or hand-held devices.

Verification interfaces 120 and 140 may include, for example, touch sensors 122 and 142, as well as visual sensors 124 and 144. In embodiments, touch sensors 122 and 142 may include, for example, a touch-sensitive screen or other input configuration capable of capturing a tactile pattern, such as a fingerprint or other tactile-based biometric measurement. In embodiments, touch sensors 122 and 142 may be further capable of analyzing chemical biomarkers (e.g., electrolyte concentrations, serum markers, cellular proteins, etc.), or performing other techniques for biometric authentication of the device's user.

Verification interfaces 120 and 140 may further include, for example, visual sensors 124 and 144. Visual sensors 124 and 144 may include cameras and software capable of executing iris scans, retinal scans, facial recognition techniques, etc., in order to use biometric measurements to verify the identity of the device's user.

The server 160, the consumer device 110, and the enterprise device 130 may be distant from each other and communicate over a network 150. In some embodiments, the server 160 may be a central hub from which the consumer device 110 and the enterprise device 130 can establish a communication connection, such as in a client-server networking model. Alternatively, the server 160, the consumer device 110, and the enterprise device 130 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the server 160, the consumer device 110, and the enterprise device 130 may be local to each other, and communicate via any appropriate local communication medium. For example, the server 160, the consumer device 110, and the enterprise device 130 may communicate using a local area network (LAN), one or more hardwire connections, a wireless link or router, or an intranet. In some embodiments, the server 160, the consumer device 110, and the enterprise device 130 may be communicatively coupled using a combination of one or more networks and/or one or more local connections. For example, the enterprise device 130 may be hardwired to the server 160 (e.g., connected with an Ethernet cable) while the consumer device 110 may communicate with the enterprise device 130 and/or server 160 using the network 150 (e.g., over the Internet, via telephone communication lines, etc.).

In some embodiments, the network 150 can be implemented within a cloud computing environment, or using one or more cloud computing services (not pictured). Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the server 160 may include storage 168 and a verification application 170. In embodiments, the verification application 170 may reside, in part or completely, in the storage 168 and/or memory 166 of the server 160. The verification application 170 may include, in addition to the program instructions necessary to perform the methods described herein, a database 180. The database 180 may further include Touch ID 182, which may include a list of tactile-based patterns for each consumer and/or enterprise employee, where the tactile-based patterns include biometric measurements that may be used to verify the identity of the consumer and/or employee. For example, the tactile-based patterns may include fingerprints or other inputs received via touch sensors, such as, for example, touch sensors 122 and 142.

Database 180 may further include Visual ID 184. Visual ID 184 may include a list of visual-based patterns for each consumer and/or enterprise employee, where the visual-based patterns include biometric measurements that may be used to verify the identity of the consumer and/or employee. For example, the visual-based patterns may include iris scans, retinal scans, facial recognition metrics, etc., as described herein.

Database 180 may further include Hardware ID 188. Hardware ID 188 may include a list of unique identifiers for the mobile devices and other pieces of hardware used by the consumer and/or enterprise employee. For example, Hardware ID 188 may include the serial numbers for memory modules, hard disks, or any other electronic component within the consumer's mobile device, the enterprise employee's computing station or telephone, etc. As described herein, the unique identifiers may be used in the derivation of security keys used by verification application 170 to establish a secure connection among the server 160, consumer device 110, and enterprise device 130.

In embodiments, database 180 may further include a lockout list 186. Lockout list 186 may include information regarding failed verification attempts. For example, if an enterprise employee fails to provide genuine credentials for verification three times in a row, the enterprise device 130's IP address, phone number, or other identifying information may be added to the lockout list 186. Devices whose information is contained within lockout list 186 may be prevented from establishing communications via verification application 170, at least until an administrator can verify the authenticity of the device, or until other security measures can be performed to verify that the device's information has been erroneously included in lockout list 186, at which point the device information may be removed from lockout list 186.

While FIG. 1 illustrates a networking environment 100 with a single server 160, a single consumer device 110, and a single enterprise device 130, suitable networking environments for implementing embodiments of this disclosure may include any number of consumer devices, enterprise device, and servers. The various models, modules, systems, and components illustrated in FIG. 1 may exist, if at all, across a plurality of consumer devices, enterprise devices, and servers. For example, some embodiments may include two servers. The two servers may be communicatively coupled using any suitable communications connection (e.g., using a WAN, a LAN, a wired connection, an intranet, or the Internet). Yet other embodiments may include a plurality of consumer and enterprise devices.

It is noted that FIG. 1 is intended to depict the representative major components of a networking environment 100. In some embodiments, however, individual components may have greater or lesser complexity than as represented in FIG. 1, components other than or in addition to those shown in FIG. 1 may be present, and the number, type, and configuration of such components may vary.

Figure 2:
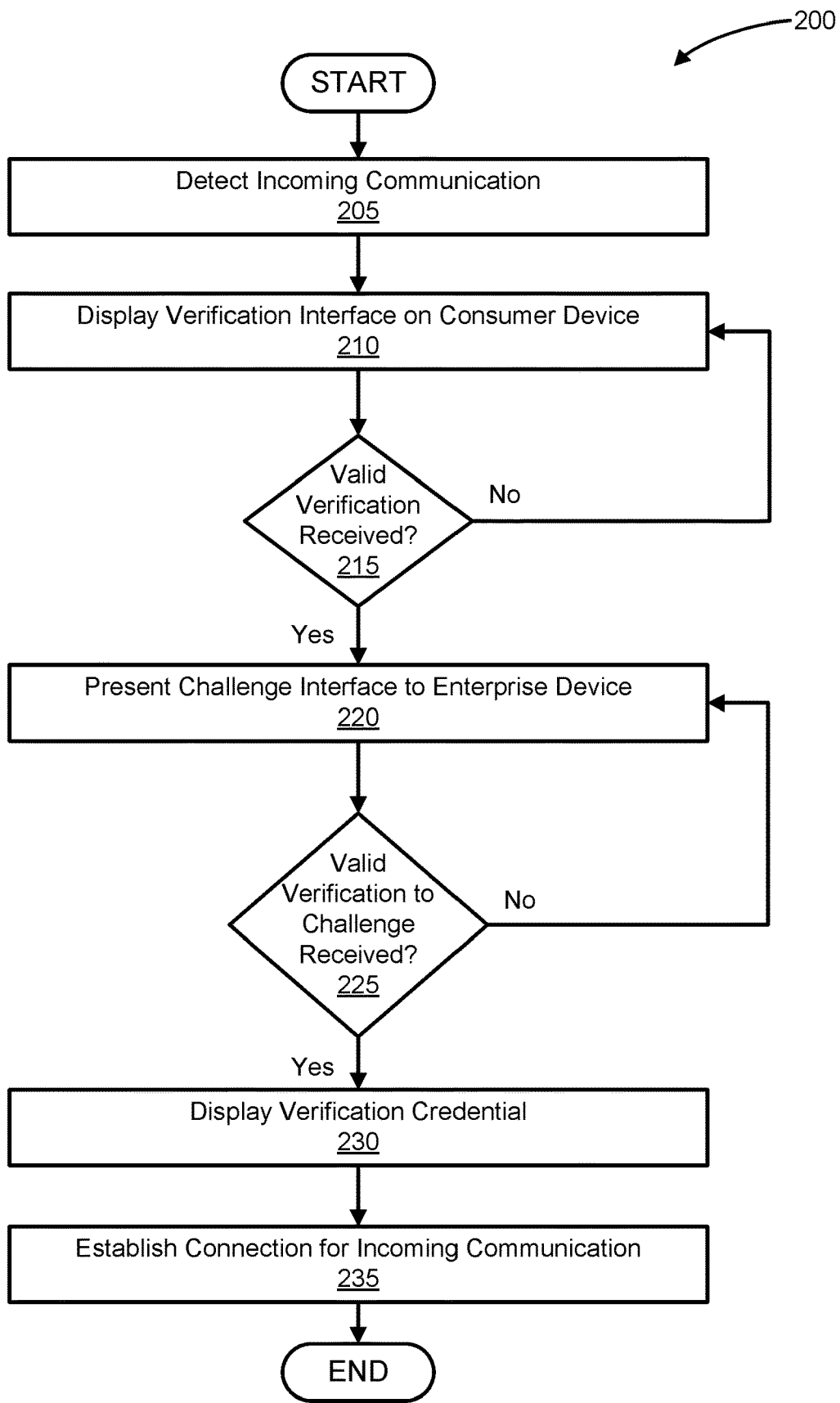
FIG. 2 illustrates a flowchart of a method for mutual authentication of an enterprise-initiated communication, according to embodiments of the present disclosure.

Referring now to FIG. 2, shown is a flowchart for a method 200 for mutual authentication of an enterprise-initiated communication, according to embodiments of the present disclosure. To illustrate method 200, FIG. 2 is described within the context of the networking environment 100 of FIG. 1.

Method 200 may begin at 205, where an incoming communication is detected. For example, a verification application on a consumer's device may detect that an incoming telephone call from an enterprise, such as a local utility company. In some embodiments, a verification application may exchange security keys at this point, to determine whether the expected device has been contacted (e.g., security keys derived from unique identifiers may be exchanged, as described herein).

At 210, the verification application may cause a verification interface to be displayed on the consumer's device. For example, a prompt may display on the consumer's device asking the consumer to provide a biometric measurement (e.g., a fingerprint, iris scan, retinal scan, facial scan, etc.) or combination of biometric measurements to verify the consumer's identity.

At 215, it may be determined whether the biometric measurement(s) constitute a valid verification. For example, a verification application may consult a database of pre-recorded biometric measurements for the consumer and compare the received biometric measurement(s) with the pre-recorded biometric measurements to determine whether a similarity threshold has been met.

If, at 215, it is determined that the verification is invalid, the method may return to 210 and request another verification. In embodiments, the receipt of a given number of invalid verifications may cause the method to terminate (not shown), and the device's credentials may be recorded in a lockout list, such as lockout list 186 of FIG. 1.

If, at 215, it is determined that the verification is valid, the method may proceed to 220. At 220, a challenge interface may be displayed on the enterprise device. For example, a prompt may display on the enterprise device asking the enterprise employee to provide a biometric measurement (e.g., a fingerprint, iris scan, retinal scan, facial scan, etc.) or combination of biometric measurements to verify the employee's identity.

At 225, it may be determined whether the biometric measurement(s) constitute a valid verification of the challenge. For example, a verification application may consult a database of pre-recorded biometric measurements for the employee and compare the received biometric measurement(s) with the pre-recorded biometric measurements to determine whether a similarity threshold has been met.

If, at 225, it is determined that the challenge verification is invalid, the method may return to 220 and request another verification. In embodiments, the receipt of a given number of invalid challenge verifications may cause the method to terminate (not shown), and the enterprise device's credentials may be recorded in a lockout list, such as lockout list 186 of FIG. 1.

If, at 225, it is determined that the challenge verification is valid, a verification credential may be displayed at 230. The verification credential may be displayed to both the consumer and the enterprise employee to alert both parties as to the mutual authentication of identities. In embodiments, the verification credential may be, for example, a medallion symbol, a green checkmark, a secured padlock symbol, or any other suitable indicator for alerting the parties of the successful mutual authentication.

At 235, a connection is established for the incoming communication. This may include, for example, the connection of a telephone line communication, the connection of two chat windows, the sending of near-simultaneous textual communications (e.g., e-mail), the connection of video-conferencing (e.g., Skype®, WebEx®, Zoom®, etc.).

Figure 3:
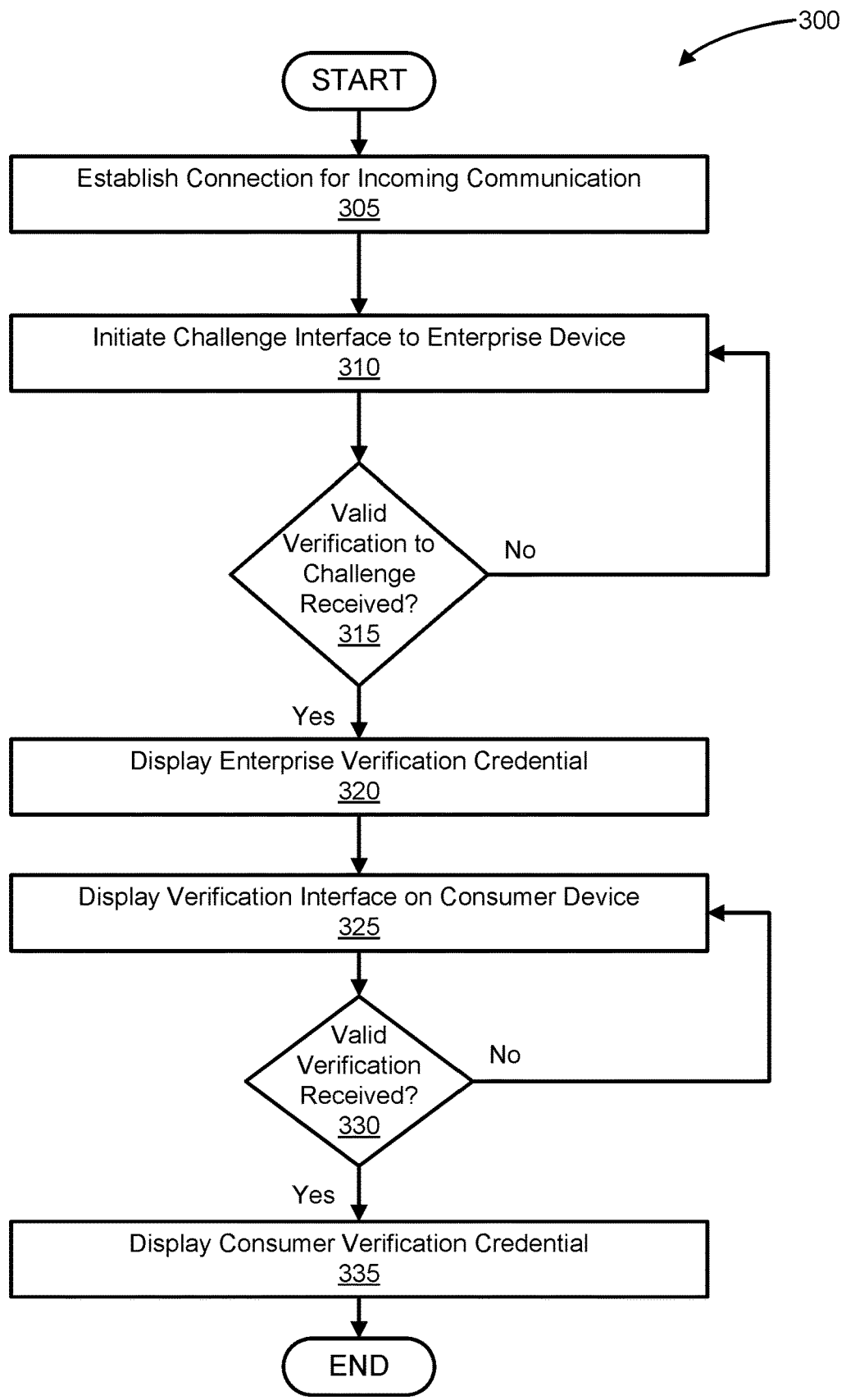
FIG. 3 depicts a flowchart of a method for mutual authentication of an unknown communication, according to embodiments of the present disclosure.

Referring now to FIG. 3, shown is a flowchart for a method 300 for mutual authentication of an unknown communication, according to embodiments of the present disclosure.

The method 300 may begin at 305, where a connection is established for the incoming communication. This may include, for example, the connection of a telephone line communication, the connection of two chat windows, the sending of near-simultaneous textual communications (e.g., e-mail), the connection of video-conferencing (e.g., Skype®, WebEx®, Zoom®, etc.).

At some point during the communication, the consumer may become suspicious as to the authenticity of the communication's origin. The consumer may initiate a challenge via the verification application, causing the challenge interface to be initiated at the legitimate enterprise's device at 310. In some embodiments, a verification application may exchange security keys at this point, to determine whether the expected device has been contacted (e.g., security keys derived from unique identifiers may be exchanged, as described herein).

In embodiments, a prompt may display on the enterprise device asking an enterprise employee to provide a biometric measurement (e.g., a fingerprint, iris scan, retinal scan, facial scan, etc.) or combination of biometric measurements to verify the employee's identity. If no communication has been initiated by any employee at the enterprise, the communication may be terminated, and the fraudulent caller's credentials may be logged in a lockout list (not shown), such as lockout list 186 of FIG. 1.

At 315, it may be determined whether the biometric measurement(s) constitute a valid verification of the challenge. For example, a verification application may consult a database of pre-recorded biometric measurements for the employee and compare the received biometric measurement(s) with the pre-recorded biometric measurements to determine whether a similarity threshold has been met.

If, at 315, it is determined that the challenge verification is invalid, the method may return to 310 and request another verification. In embodiments, the receipt of a given number of invalid challenge verifications may cause the method to terminate (not shown), and the enterprise device's credentials may be recorded in a lockout list, such as lockout list 186 of FIG. 1.

If, at 315, it is determined that the challenge verification is valid, an enterprise verification credential may be displayed to the consumer at 320. In embodiments, the verification credential may be, for example, a medallion symbol, a green checkmark, a secured padlock symbol, etc.

At 325, the verification application may cause a verification interface to be displayed on the consumer's device. For example, a prompt may display on the consumer's device asking the consumer to provide a biometric measurement (e.g., a fingerprint, iris scan, retinal scan, facial scan, etc.) or combination of biometric measurements to verify the consumer's identity.

At 330, it may be determined whether the biometric measurement(s) constitute a valid verification. For example, a verification application may consult a database of pre-recorded biometric measurements for the consumer and compare the received biometric measurement(s) with the pre-recorded biometric measurements to determine whether a similarity threshold has been met.

If, at 330, it is determined that the verification is invalid, the method may return to 325 and request another verification. In embodiments, the receipt of a given number of invalid verifications may cause the method to terminate (not shown), and the device's credentials may be recorded in a lockout list, such as lockout list 186 of FIG. 1.

If, at 330, it is determined that the challenge verification is valid, a consumer verification credential may be displayed to the enterprise employee at 335. In embodiments, the verification credential may be, for example, a medallion symbol, a green checkmark, a secured padlock symbol, etc.

Figure 4:
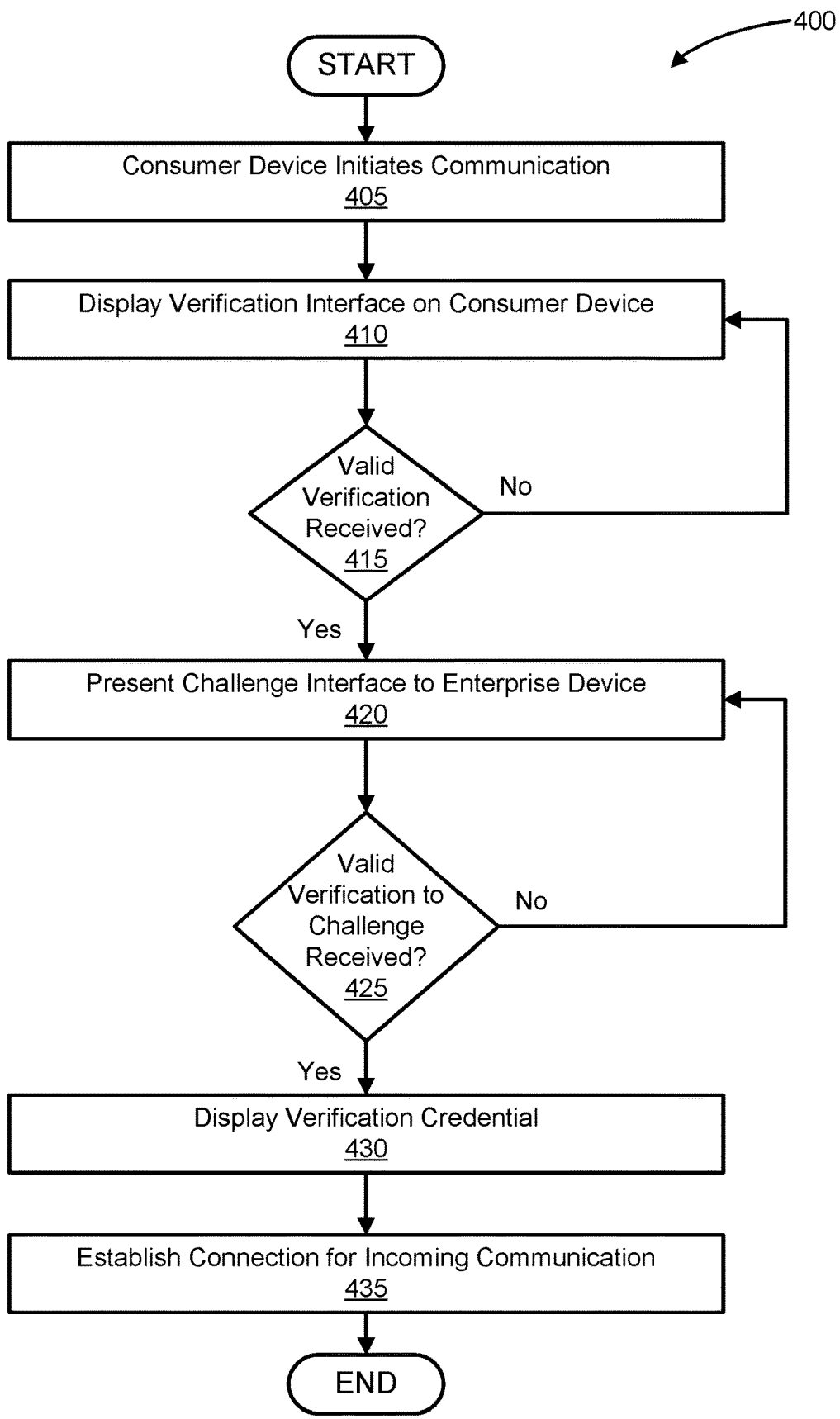
FIG. 4 depicts a flowchart of a method for mutual authentication of a consumer-initiated communication, according to embodiments of the present disclosure.

Referring now to FIG. 4, shown is a method 400 for mutual authentication of a consumer-initiated communication, according to embodiments. Method 400 may begin at 405, where a consumer initiates a communication with an enterprise, such as a bank or credit union, for example. In some embodiments, a verification application may exchange security keys at this point, to determine whether the expected device has been contacted (e.g., security keys derived from unique identifiers may be exchanged, as described herein).

At 410, the verification application may cause a verification interface to be displayed on the consumer's device. For example, a prompt may display on the consumer's device asking the consumer to provide a biometric measurement (e.g., a fingerprint, iris scan, retinal scan, facial scan, etc.) or combination of biometric measurements to verify the consumer's identity.

At 415, it may be determined whether the biometric measurement(s) constitute a valid verification. For example, a verification application may consult a database of pre-recorded biometric measurements for the consumer and compare the received biometric measurement(s) with the pre-recorded biometric measurements to determine whether a similarity threshold has been met.

If, at 415, it is determined that the verification is invalid, the method may return to 410 and request another verification. In embodiments, the receipt of a given number of invalid verifications may cause the method to terminate (not shown), and the device's credentials may be recorded in a lockout list, such as lockout list 186 of FIG. 1.

If, at 415, it is determined that the verification is valid, the method may proceed to 420. At 420, a challenge interface may be displayed on the enterprise device. For example, a prompt may display on the enterprise device asking the enterprise employee to provide a biometric measurement (e.g., a fingerprint, iris scan, retinal scan, facial scan, etc.) or combination of biometric measurements to verify the employee's identity.

At 425, it may be determined whether the biometric measurement(s) constitute a valid verification of the challenge. For example, a verification application may consult a database of pre-recorded biometric measurements for the employee and compare the received biometric measurement(s) with the pre-recorded biometric measurements to determine whether a similarity threshold has been met.

If, at 425, it is determined that the challenge verification is invalid, the method may return to 420 and request another verification. In embodiments, the receipt of a given number of invalid challenge verifications may cause the method to terminate (not shown), and the enterprise device's credentials may be recorded in a lockout list, such as lockout list 186 of FIG. 1.

If, at 425, it is determined that the challenge verification is valid, a verification credential may be displayed at 430. The verification credential may be displayed to both the consumer and the enterprise employee to alert both parties as to the mutual authentication of identities. In embodiments, the verification credential may be, for example, a medallion symbol, a green checkmark, a secured padlock symbol, or any other suitable indicator for alerting the parties of the successful mutual authentication.

At 435, a connection is established for the incoming communication. This may include, for example, the connection of a telephone line communication, the connection of two chat windows, the sending of near-simultaneous textual communications (e.g., e-mail), the connection of video-conferencing (e.g., Skype®, WebEx®, Zoom®, etc.).

Figure 5:
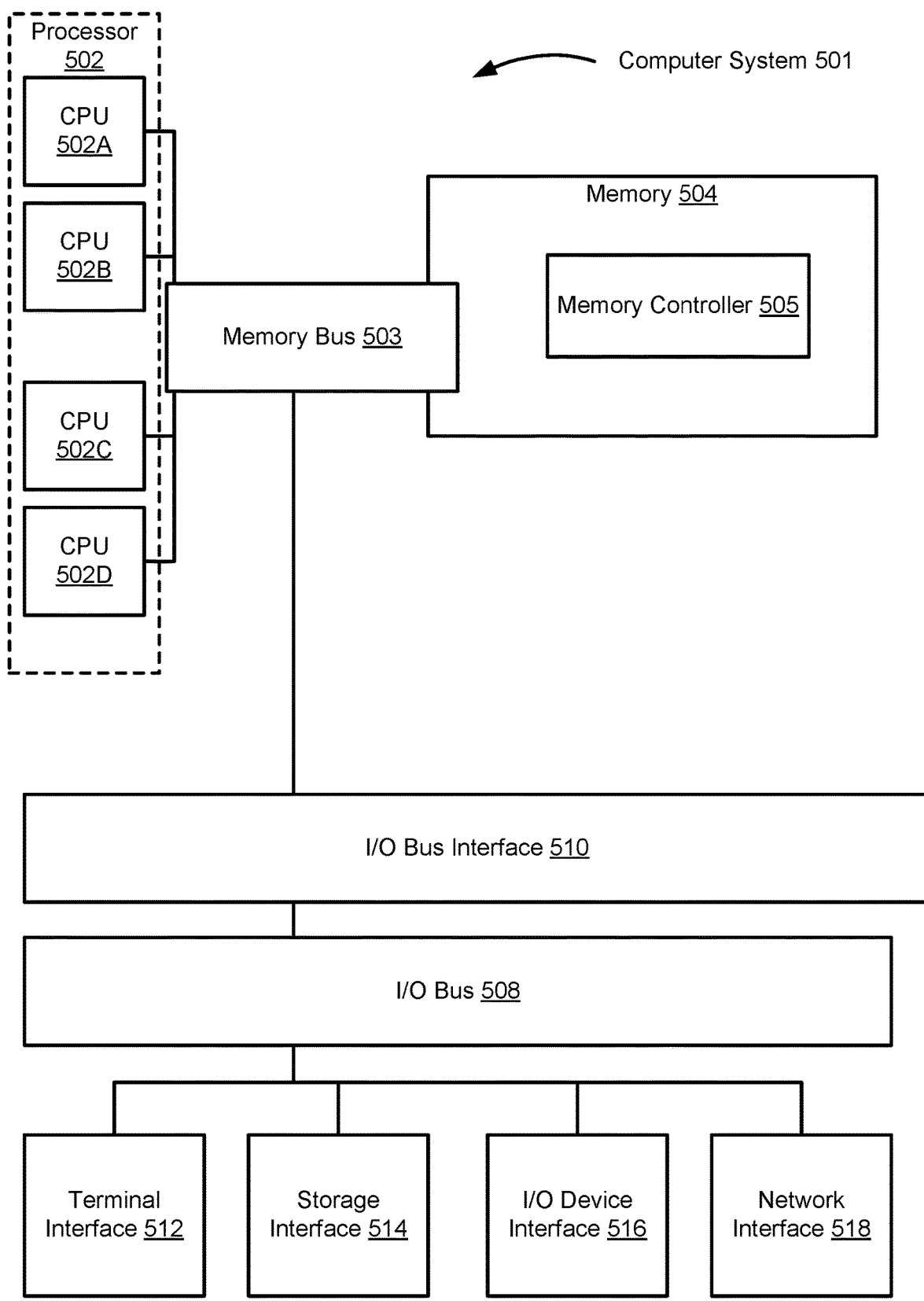
FIG. 5 depicts a high-level block diagram of an example computer system that may be used in implementing embodiments of the present disclosure.

Referring now to FIG. 5, shown is a high-level block diagram of an example computer system (e.g., computer) 501 that may be configured to perform various aspects of the present disclosure, including, for example, methods 200/300/400, described in FIGS. 2/3/4, respectively. The example computer system 501 may be used in implementing one or more of the methods or modules, and any related functions or operations, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 501, and may also include the virtual memory of other computer systems coupled to the computer system 501 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an example computer system 501. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for mutual authentication of communications, comprising:
    detecting an incoming communication to a consumer device from an enterprise device;
    in response to detecting the incoming communication, causing a verification interface to be displayed on the consumer device;
    receiving, from the consumer device, a first valid verification via the verification interface;
    in response to receiving the first valid verification, causing a challenge interface to be displayed on the enterprise device;
    receiving, from the enterprise device, a second valid verification via the challenge interface;
    in response to receiving the second valid verification, presenting, to both the consumer device and the enterprise device, a verification credential; and
    based on the second valid verification, establishing, between the consumer device and the enterprise device, a new connection for the incoming communication.

2. The method of claim 1, wherein the first valid verification includes an authentic biometric measurement of a user of the consumer device, wherein the biometric measurement confirms the identity of the user of the consumer device.

3. The method of claim 1, wherein an invalid verification is received via the verification interface, the method further comprising:
    determining a security criterion has been met; and
    in response to determining the security criterion has been met, adding an identifier for the consumer device to a lockout list.

4. The method of claim 1, wherein an invalid verification is received via the challenge interface, the method further comprising:
    determining a security criterion has been met; and
    in response to determining the security criterion has been met, adding an identifier for the enterprise device to a lockout list.

5. The method of claim 1, wherein the first and second valid verifications are executed via an out-of-band line of communication.

6. The method of claim 3, further comprising:
    determining the identifier was erroneously added to the lockout list; and
    in response to determining the identifier was erroneously added, removing the identifier from the lockout list.

7. The method of claim 4, further comprising:
    determining the identifier was erroneously added to the lockout list; and
    in response to determining the identifier was erroneously added, removing the identifier from the lockout list.

8. The method of claim 5, wherein the first and second valid verifications include keys derived from unique identifiers of the consumer device and the enterprise device, respectively.

9. A computer program product for mutual authentication of communications, the computer program product comprising a computer readable storage medium having program instructions embodied therewith, the program instructions executable by a device to cause the device to:
  detect an incoming communication to a consumer device from an enterprise device;
  in response to detecting the incoming communication, causing a verification interface to be displayed on the consumer device;
  receive, from the consumer device, a first valid verification via the verification interface;
  in response to receiving the first valid verification, causing a challenge interface to be displayed on the enterprise device;
  receive, from the enterprise device, a second valid verification via the challenge interface;
  in response to receiving the second valid verification, present, to both the consumer device and the enterprise device, a verification credential; and
  based on the second valid verification, establish, between the consumer device and the enterprise device, a new connection for the incoming communication.

10. The computer program product of claim 9, wherein the first valid verification includes an authentic biometric measurement of a user of the consumer device, wherein the biometric measurement confirms the identity of the user of the consumer device.

11. The computer program product of claim 9, wherein an invalid verification is received via the verification interface, the program instructions further causing the device to:
  determine a security criterion has been met; and
  in response to determining the security criterion has been met, add an identifier for the consumer device to a lockout list.

12. The computer program product of claim 9, wherein an invalid verification is received via the challenge interface, the program instructions further causing the device to:
  determine a security criterion has been met; and
  in response to determining the security criterion has been met, add an identifier for the enterprise device to a lockout list.

13. The computer program product of claim 9, wherein the first and second valid verifications are executed via an out-of-band line of communication.

14. The computer program product of claim 11, wherein the program instructions further cause the device to:
  determine the identifier was erroneously added to the lockout list; and
  in response to determining the identifier was erroneously added, remove the identifier from the lockout list.

15. The computer program product of claim 12, wherein the program instructions further cause the device to:
  determine the identifier was erroneously added to the lockout list; and
  in response to determining the identifier was erroneously added, remove the identifier from the lockout list.

16. The computer program product of claim 13, wherein the first and second valid verifications include keys derived from unique identifiers of the consumer device and the enterprise device, respectively.

17. A system for mutual authentication of communications, comprising:
  a memory with program instructions stored thereon; and
  a processor in communication with the memory, wherein the program instructions are executable by the processor to cause the system to:
    detect an incoming communication to a consumer device from an enterprise device;
    in response to detecting the incoming communication, causing a verification interface to be displayed on the consumer device;
    receive, from the consumer device, a first valid verification via the verification interface;
    in response to receiving the first valid verification, causing a challenge interface to be displayed on the enterprise device;
    receive, from the enterprise device, a second valid verification via the challenge interface;
    in response to receiving the second valid verification, present, to both the consumer device and the enterprise device, a verification credential; and
    based on the second valid verification, establish, between the consumer device and the enterprise device, a new connection for the incoming communication.

18. The system of claim 17, wherein the first valid verification includes an authentic biometric measurement of a user of the consumer device, wherein the biometric measurement confirms the identity of the user of the consumer device.

19. The system of claim 17, wherein the first and second valid verifications are executed via an out-of-band line of communication.

20. The system of claim 19, wherein the first and second valid verifications include keys derived from unique identifiers of the consumer device and the enterprise device, respectively.

* * * * *